S. A. MOSS.
TURBO SUPERCHARGER FOR AEROPLANES.
APPLICATION FILED MAY 31, 1919.

1,413,418.

Patented Apr. 18, 1922.
2 SHEETS—SHEET 1.

Inventor,
Sanford A. Moss,
by *Albert G. Davis*
His Attorney

S. A. MOSS.
TURBO SUPERCHARGER FOR AEROPLANES.
APPLICATION FILED MAY 31, 1919.
1,413,418.
Patented Apr. 18, 1922.
2 SHEETS—SHEET 2.
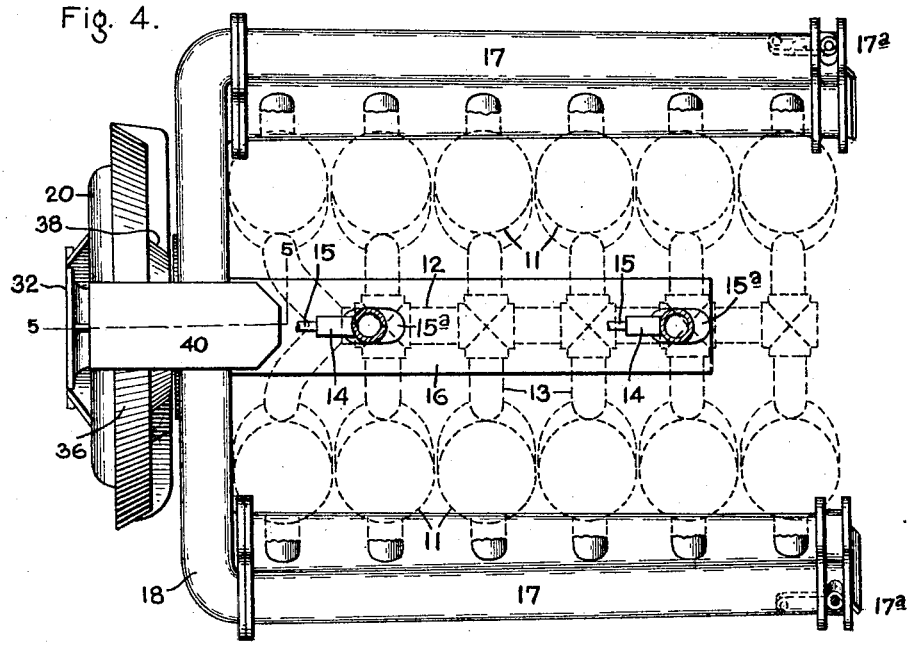
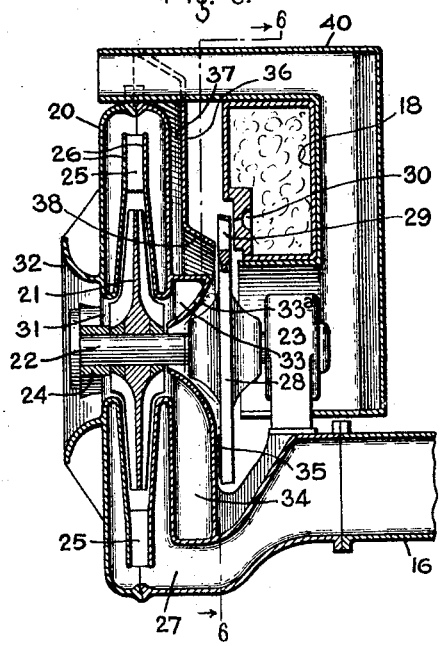
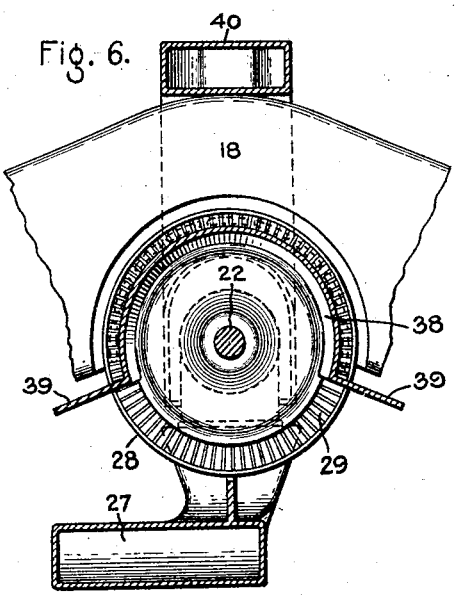
Inventor,
Sanford A. Moss,
by
His Attorney.

UNITED STATES PATENT OFFICE.

SANFORD A. MOSS, OF LYNN, MASSACHUSETTS, ASSIGNOR TO GENERAL ELECTRIC COMPANY, A CORPORATION OF NEW YORK.

TURBOSUPERCHARGER FOR AEROPLANES.

1,413,418.  Specification of Letters Patent.  Patented Apr. 18, 1922.

Application filed May 31, 1919. Serial No. 301,104.

*To all whom it may concern:*

Be it known that I, SANFORD A. MOSS, a citizen of the United States, residing at Lynn, county of Essex, State of Massachusetts, have invented certain new and useful Improvements in Turbosuperchargers for Aeroplanes, of which the following is a specification.

The present invention relates to aeroplanes having turbo-air compressors driven by exhaust gases from the engines for supplying compressed air to the engines so that in high altitudes the engines will be furnished with air at a suitable pressure for efficient operation. Compressors used for this purpose are termed superchargers. The exhaust gases of an internal combustion engine have a high temperature and one of the principal difficulties met with in connection with such a turbo-driven compressor or supercharger has been to provide an efficient cooling means for the nozzles and wheel or wheels of the turbine.

The object of the present invention is to provide in connection with an aeroplane an improved structure and arrangement of gas driven turbo-compressor which will be efficiently cooled, and for a consideration of what I believe to be novel and my invention, attention is directed to the accompanying description and the claims appended thereto.

Figure 1:
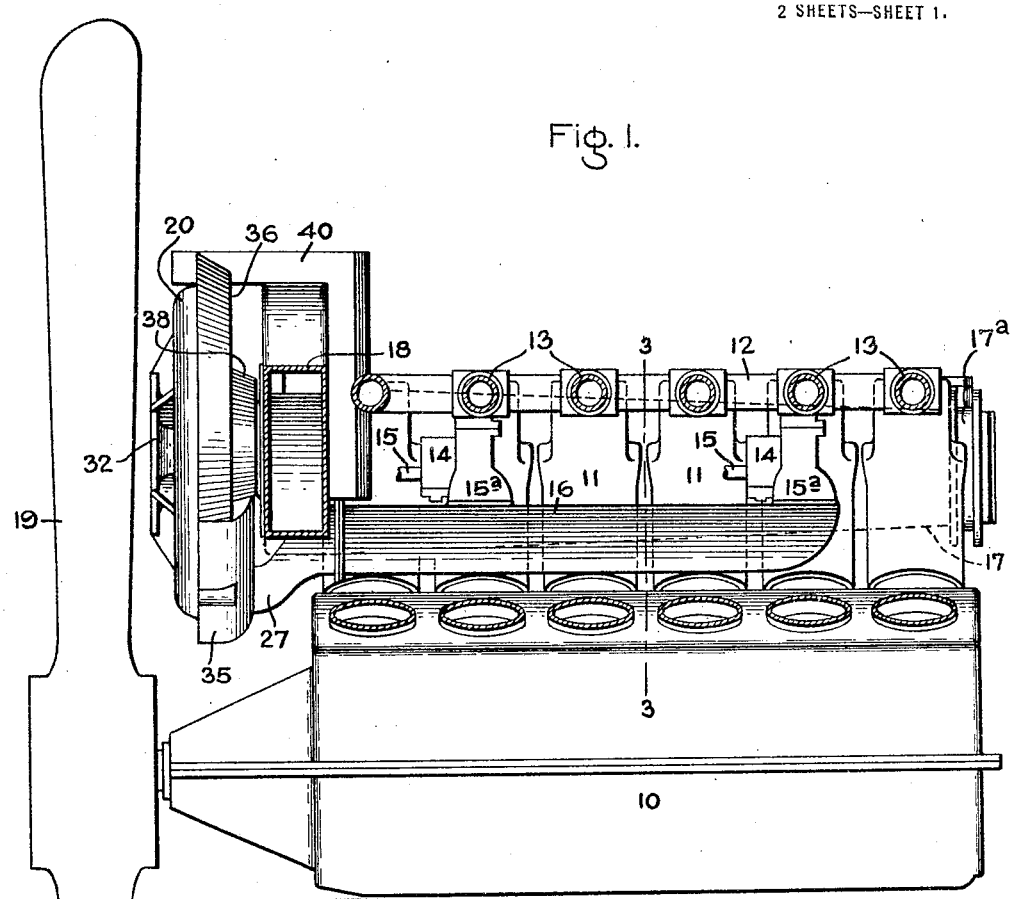
Figure 2:
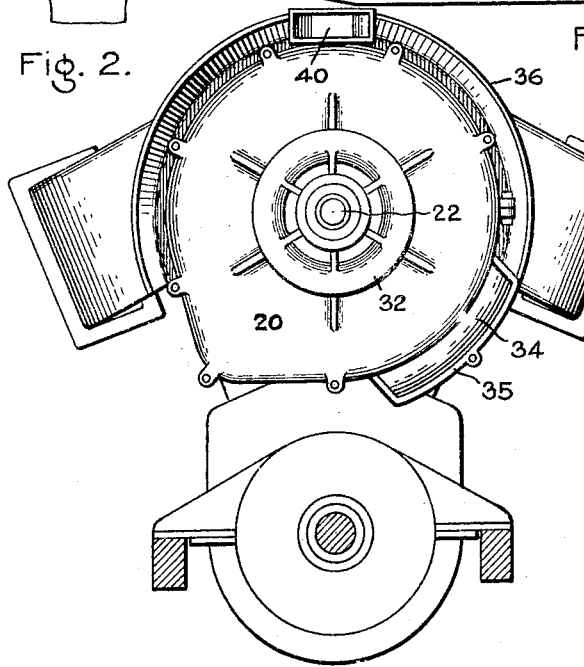
Figure 3:
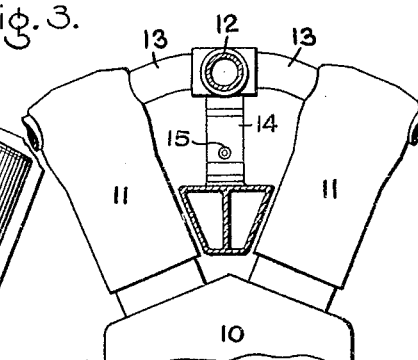

In the drawing Fig. 1 is a side elevation partly in section of an aeroplane engine equipped with a supercharger embodying my invention; Fig. 2 is an end view of the engine and supercharger with the propeller omitted; Fig. 3 is a section taken on line 3—3, Fig. 1; Fig. 4 is a plan view of the engine and supercharger; Fig. 5 is an axial sectional view taken on line 5—5, Fig. 4, and Fig. 6 is a section on line 6—6, Fig. 5.

Referring to the drawing, 10 indicates the crank casing of an engine and 11 the cylinders. In the present invention a twelve cylinder engine is illustrated, the same having two rows of six cylinders each arranged in V-shaped relation to each other. Arranged between the two rows of cylinders is an intake manifold 12 from which lead intake pipes 13 one to each cylinder, and connected to manifold 12 are two carburetors 14 which may be of the float feed type. 15 indicates pipes for conveying fuel to the float chambers of the carburetors. The air intakes 15$^a$ of the carburetors are connected to an air supply conduit 16 which is supplied with air from a supercharger comprising a centrifugal compressor driven by a turbine operated by exhaust gases from the engine. The exhaust manifolds for the engine are shown at 17, there being one on each side of the engine running axially thereof. They are provided with valves 17$^a$ at their right hand ends, and at their left hand ends are connected to a curved casing 18 which forms a chest from which exhaust gases are supplied to operate the supercharger.

Valves 17$^a$ are controlled manually or otherwise for regulating the flow of exhaust gases to the atmosphere and thereby to gas casing 18. When valves 17$^a$ are open the greater portion of the exhaust gases are discharged from the open ends of the manifolds directly to atmosphere; when closed such gases pass to chamber 18, and when in intermediate positions the gases are partly discharged from the open ends of the manifold and partly fed to chamber 18, the division depending on the settings of valves 17$^a$. Carried by the shaft of the engine is the aeroplane propeller 19.

Mounted on the front of the engine directly behind the propeller is a centrifugal compressor comprising a casing 20 in which rotates an impeller 21. Impeller 21 is carried by a shaft 22 supported in bearings 23 and 24, and has vanes on both sides, that is, it is a double sided impeller. It receives air on both sides at its central portion and delivers it at the periphery to discharge vanes 25 carried between plates 26 and from here the air passes to a discharge outlet 27 which connects with air supply conduit 16. Carried by shaft 22 just outside casing 20 and between it and the engine is a turbine wheel 28 having a ring of buckets 29 on its periphery. Turbine wheel 28 has no casing but is located so the periphery of the wheel is adjacent casing 18, and in such casing are suitable nozzles 30 for directng exhaust gases from the casing against buckets 29. Referring to Fig. 6 it will be seen that nozzles 30 extend about half way around the ring of buckets, this being the extent of casing 18. From buckets 29 the gases exhaust directly into the atmosphere.

Air is supplied to the front side of impeller 21, i. e., the side next propeller 19, through an opening 31 surrounded by a curved flange 32 which catches air and directs it to opening 31 cooling bearing 24 as it passes, such bearing being located in opening 31. Air is supplied to the other side from an annular chamber 33 which surrounds the eye of the impeller and receives air through a conduit 34 (Figs. 1, 2 and 5) which extends across the back of the compressor casing and curves around its periphery so its open end faces toward the front of the machine. Conduit 34 is formed by a portion of the back wall of the compressor casing and by a curved wall 35.

The front side of the compressor casing is cooled by the air stream from propeller 19 and the rear side is cooled by a current of air which is directed along it by wall 36 which forms between it and the compressor casing a conduit 37. Conduit 37 surrounds the upper peripheral portion of the compressor casing, extending through an arc slightly greater than that of nozzles 30 and opens toward the front of the machine so as to catch air from the propeller 19, the wall 36 being flared outward so as to catch the desired amount of air. Wall 36 extends down back of compressor casing 20 (Fig. 5) and terminates in an arcuate flange 38 which projects rearwardly toward turbine wheel 28. By this arrangement the air after passing over the compressor casing to cool the compressor will be directed against the front side of the turbine wheel to assist in cooling the wheel. It will be understood, of course, that such air even after having served to cool the compressor is still relatively cool as compared to the turbine wheel and can very effectively serve to assist in cooling such wheel. Flange 38 also serves as a shield to prevent exhaust gases from reaching the web portion of the turbine wheel and to direct it outwardly. Cooling air is also supplied to this side of the turbine wheel from chamber 33 through holes 33ª of which a suitable number are provided. All this cooling air it will be noted is supplied near the center of the wheel and is thrown out by centrifugal force to the periphery of the wheel. The extent of the arc of compressor casing 20 which wall 36 covers is indicated in Fig. 6, and at its two edges the flange 37 which projects from wall 36 is provided with two radially extending shields 39 (Fig. 6) which serves to separate the arc of turbine wheel buckets from which exhaust gases are escaping from those from which no exhaust gases are escaping. It will be noted also that the edge of flange 37 is located adjacent the inner ends of buckets 29 so gases escaping from the buckets pass along the outer side of such flange.

Cooling air is carried to the back of turbine wheel 28 by a conduit 40 which extends from a point over the top of compressor casing 20 rearwardly, then radially inward back of gas casing 18 and then forward opening toward the turbine wheel. Conduit 40 thus catches air from propeller 19 and discharges it against the central part of the rear of the turbine wheel. From here the cooling air is thrown out by centrifugal force to cool the turbine wheel, being discharged from the turbine wheel directly to atmosphere. It will be noted that bearing 23 is located in conduit 40 so it is in the path of the cooling air and is cooled thereby.

In operation exhaust gases from the engine are supplied to gas casing 18 from exhaust manifolds 17, the amount depending on the setting of valves 17ª. From casing 18 they are directed by nozzles 30 against the turbine wheel buckets 29, the pressure of the gases being converted into velocity by nozzles 30 in the well understood manner. From the buckets the gases exhaust directly to atmosphere. The turbine wheel is thus driven and drives the impeller 21 which compresses air and delivers it to the supercharger air supply conduit 16.

It will be noted that the entire arc of the bucket wheel from which at any instance hot gases are being discharged, is directly exposed to the atmosphere, there being no casing or exhaust conduit of any kind, and that as soon as the gases leave the buckets they move radially outward and are quickly dissipated by the stream of air from the propeller 19. This means that the hot exhaust gases are quickly diluted with air and removed from the vicinity of the supercharger. No part of the turbine wheel is exposed to exhaust gases except the arc of buckets which at any instance is in front of nozzles 30 as the flange 38 forms an effective partition separating such arc of buckets from the rest of the wheel and also due to its inclination directs the gases outward. Furthermore, the compressor is protected from the exhaust gases by wall 36 and the stream of air which is continuously flowing between such wall and the compressor casing. It will be noted also that there is an appreciable arc of the bucket wheel from which at any instant no exhaust gases are escaping, (this being the arc beneath shields 39, Fig. 6,) and to which cooling air is being continuously supplied, such air passing from the hub of the bucket wheel radially outward on both sides of the wheel. The wheel is thus divided at any instant into two arcs, an active arc and a cooling arc. Or expressed differently, adjacent the ring of buckets, there is an arc of nozzles for supplying gases to the wheel while all the rest of the wheel is exposed directly to the atmosphere and has cooling air continuously supplied thereto on both sides. By this arrangement the temperature of the turbine wheel is kept within permissible limits, and the whole apparatus is efficiently cooled.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In combination, a turbine wheel having no enclosing casing, nozzle means for supplying hot gases to the turbine wheel, said gases exhausting from the wheel directly to atmosphere, and means for supplying cooling air to the central portion of said turbine wheel from whence it flows radially outward to cool the wheel.

2. In combination, a compressor having a casing, a turbine wheel located outside said casing and having no enclosing casing of its own, nozzle means for supplying hot gases to said turbine wheel, such gases exhausting from the turbine wheel directly to atmosphere, and means for supplying cooling air to the central portion of said turbine wheel from whence it flows radially outward to cool the wheel.

3. In combination, a compressor having a casing, a turbine wheel located outside said casing and having no enclosing casing of its own, and nozzle means which covers an arc of the turbine wheel less than the circumference of the wheel for supplying hot gases to said wheel, such gases exhausting from the turbine wheel directly to atmosphere.

4. In a supercharger for internal combustion engines, the combination of a compressor having a casing, a turbine wheel located outside such casing, and having no enclosing casing, and nozzle means for supplying exhaust gases to the turbine wheel, such gases exhausting from the turbine wheel directly to atmosphere.

5. In a supercharger for internal combustion engines, the combination of a compressor having a casing, a turbine wheel located outside such casing, and having no enclosing casing, and nozzle means which covers an arc of the turbine wheel less than the circumference of the wheel for supplying exhaust gases thereto, such gases exhausting from the turbine wheel directly to atmosphere.

6. In a supercharger for internal combustion engines, the combination of a compressor having a casing, a turbine wheel located outside such casing, and having no enclosing casing, and nozzle means which covers an arc of the turbine wheel less than the circumference of the wheel for supplying exhaust gases thereto, such gases exhausting from the turbine wheel directly to atmosphere, and conduit means for supplying cooling air to the turbine wheel.

7. In an apparatus of the character described, a shaft, a turbine wheel thereon, a ring of buckets on the wheel, said turbine wheel having no casing so it revolves directly in the open air, and nozzle means which cover an arc of the bucket ring less than the circumference of the ring for supplying motive fluid to drive the wheel, the exhaust from the buckets passing directly to atmosphere.

8. In an apparatus of the character described, a shaft, a turbine wheel thereon, a ring of buckets on the wheel, said turbine wheel having no casing so it revolves directly in the open air, nozzle means which cover an arc of the bucket ring less than the circumference of the ring for supplying motive fluid to drive the wheel, the exhaust from the buckets passing directly to atmosphere, and a shield for protecting the rest of the turbine wheel from the exhaust.

9. In an apparatus of the character described, a shaft, a turbine wheel thereon, a ring of buckets on the wheel, said turbine wheel having no casing so it revolves directly in the open air, nozzle means which cover an arc of the bucket ring less than the circumference of the ring for supplying motive fluid to drive the wheel, the exhaust from the buckets passing directly to atmosphere, a shield for protecting the rest of the turbine wheel from the exhaust, and conduit means for supplying a cooling medium to the wheel.

10. In an apparatus of the character described, a shaft, a turbine wheel thereon, a ring of buckets on the wheel, said turbine wheel having no casing so it revolves directly in the open air, nozzle means which cover an arc of the bucket ring less than the circumference of the ring for supplying motive fluid to drive the wheel, the exhaust from the buckets passing directly to atmosphere, a shield for protecting the rest of the turbine wheel from the exhaust, and conduit means for supplying a cooling medium to the central portion of the turbine wheel from which point it is thrown out by centrifugal force to cool the wheel.

11. In combination, a compressor having a casing, a turbine wheel located directly adjacent the said casing outside the same, means for supplying motive fluid to said turbine wheel throughout a part only of its circumference, such motive fluid exhausting from the turbine wheel directly to atmosphere, and a wall between the compressor casing and turbine wheel which provides a conduit for cooling air for the compressor casing and protects it from the exhaust motive fluid.

12. The combination with an aeroplane engine and a propeller driven thereby, of a supercharger located directly back of the propeller comprising a centrifugal compressor having a casing, a turbine wheel located adjacent the compressor casing on the side of it remote from the propeller, said turbine wheel having a ring of buckets, nozzle means for supplying exhaust gases from the engine to said buckets such gases exhausting from said buckets directly to atmosphere, and a wall forming a conduit for conveying air from the propeller over the compressor casing to cool it and protect it from said exhaust gases.

13. The combination with an aeroplane engine and a propeller driven thereby, of a supercharger located directly back of the propeller comprising a centrifugal compressor having a casing, a turbine wheel located adjacent the compressor casing on the side of it, remote from the propeller, said turbine wheel having a ring of buckets, nozzle means for supplying exhaust gases from the engine to said buckets such gases exhausting from said buckets directly to atmosphere, a wall forming a conduit for conveying air from the propeller over the compressor casing to cool it and protect it from said exhaust gases, and conduit means for conveying air from the propeller to the turbine wheel to cool such wheel.

14. The combination with an aeroplane engine and a propeller driven thereby, of a supercharger located directly back of the propeller comprising a centrifugal compressor having a casing, a turbine wheel located adjacent the compressor casing on the side of it remote from the propeller, said turbine wheel having a ring of buckets, nozzle means for supplying exhaust gases from the engine to said buckets such gases exhausting from said buckets directly to atmosphere, a wall forming a conduit for conveying air from the propeller over the compressor casing to cool it and protect it from said exhaust gases, and conduit means for conveying air from the propeller to the central portion of the turbine wheel from where it is thrown radially outward by centrifugal force to cool the wheel.

15. The combination with an aeroplane engine and a propeller driven thereby, of a supercharger located directly back of the propeller and in the path of the propeller air stream, said supercharger comprising a centrifugal compressor having a casing, an impeller therein which receives air on both sides, and conduit means for conveying air from the propeller air stream to both sides of the impeller.

16. The combination with an aeroplane engine and a propeller driven thereby, of a supercharger located directly back of the propeller and in the path of the propeller air stream, said supercharger comprising a centrifugal compressor having a casing provided with inlet openings on both sides, a double sided impeller therein, and conduit means which open toward the propeller and convey air to said inlet openings.

17. The combination with an aeroplane engine and a propeller driven thereby, of a supercharger located directly back of the propeller and in the path of the propeller air stream, said supercharger comprising a centrifugal compressor having a casing provided with inlet openings on both sides, a double sided impeller therein, conduit means which opens toward the propeller and convey air to said inlet openings, and a wall which forms with the compressor casing a conduit facing the propeller and extending over the side of the compressor casing remote from the propeller for conveying cooling air over the compressor casing to cool it.

18. The combination with an aeroplane engine and a propeller driven thereby, of a supercharger located directly back of the propeller comprising a centrifugal compressor having a casing, a turbine wheel located adjacent the compressor casing on the side of it remote from the propeller, said turbine wheel having a ring of buckets, nozzle means for supplying exhaust gases from the engine to said buckets such gases exhausting from said buckets directly to atmosphere, and a wall forming a conduit for conveying air from the propeller over the compressor casing to cool it and protect it from said exhaust gases, said wall having a flange which projects toward the turbine wheel whereby air from said conduit is discharged against the turbine wheel to cool it.

19. The combination with an aeroplane engine and a propeller driven thereby, of a supercharger located directly back of the propeller comprising a centrifugal compressor having a casing, a turbine wheel located adjacent the compressor casing on the side of it remote from the propeller, said turbine wheel having a ring of buckets, nozzle means for supplying exhaust gases from the engine to said buckets such gases exhausting from said buckets directly to atmosphere, a wall forming a conduit for conveying air from the propeller over the compressor casing to cool it and protect it from said exhaust gases, said wall having a flange which projects toward the turbine wheel whereby air from said conduit is discharged against one side of said turbine wheel to cool it, and conduit means for conveying cooling air to the other side of the turbine wheel.

20. The combination with an aeroplane engine and a propeller driven thereby, of a supercharger located directly back of the propeller comprising a centrifugal compressor having a casing, a turbine wheel located adjacent the compressor casing on the side of it remote from the propeller, said turbine wheel having a ring of buckets, nozzle means for supplying exhaust gases from the engine to said buckets such gases exhausting from said buckets directly to atmosphere, a wall forming a conduit for conveying air from the propeller over the compressor casing to cool it and protect it from said exhaust gases, said wall having a flange which projects toward the turbine wheel whereby air from said conduit is discharged against one side of said turbine wheel to cool it, and conduit means for conveying cooling air to the central portion of the other side of the turbine wheel from where it is thrown outward by centrifugal force to cool the wheel.

21. The combination with an aeroplane engine and a propeller driven thereby, of a supercharger located directly back of the propeller and in the path of the propeller air stream, said supercharger comprising a centrifugal compressor having a casing provided with an inlet opening on the side remote from the propeller, a conduit for conveying air to said compressor inlet opening, and a turbine wheel located adjacent said conduit, said conduit having openings through which cooling air is supplied from the conduit to the turbine wheel.

22. The combination with an aeroplane having a propeller, of a turbo-compressor comprising a turbine wheel and a compressor wheel, and means for directing air from the propeller between said two wheels to act as a cooling medium to cool the same.

23. The combination with an aeroplane having a propeller, of a turbo-compressor comprising a turbine wheel and a compressor wheel, a casing for the compressor wheel, and means for directing air from the propeller over said casing and into contact with said turbine wheel to cool the same.

24. The combination with an aeroplane having a propeller, of a turbo-compressor comprising a turbine wheel and a compressor wheel, said turbo-compressor being located in the path of the propeller air stream, and means for directing air from the propeller air stream between said two wheels to cool them.

25. In combination, a compressor having a casing, a turbine wheel located directly adjacent the said casing outside the same, means for supplying motive fluid to said turbine wheel, and a wall between the compressor casing and the turbine wheel which provides a conduit for cooling air for the compressor casing and protects it from the exhaust motive fluid.

26. The combination with an aeroplane having a propeller, of a compressor having a casing and a turbine wheel located directly adjacent thereto, and outside the same, said compressor and wheel being adjacent the propeller, means for supplying motive fluid to the turbine wheel, and a wall between the compressor casing and the turbine wheel which provides a conduit for cooling air for the compressor casing and the wheel.

27. The combination of an aeroplane having a propeller, of a supercharger located adjacent thereto, said supercharger comprising an impeller having a casing and a turbine wheel adjacent thereto, and a partition between said casing and turbine wheel which serves to direct air from the propeller over the casing and turbine wheel for cooling the same.

28. The combination of an aeroplane having a propeller, of a supercharger located adjacent thereto, and comprising an impeller having a casing and a turbine wheel located directly adjacent to and outside such casing, and a partition member between said casing and turbine wheel which provides two distinct air passages which connect with one another near the inner part of said partition member.

29. In a supercharger for aeroplanes, the combination of a compressor having a casing, a turbine wheel located directly adjacent thereto and having no casing, means for supplying operating fluid to said turbine wheel, and a partition member located between the casing and turbine wheel which serves to define a path for the circulation of cooling air to cool the compressor and turbine wheel.

30. The combination of an aeroplane having a propeller, of a supercharger located directly behind the propeller and in the path of the propeller air stream, said supercharger comprising a centrifugal compressor having a casing, a turbine wheel located adjacent said casing, and means defining a path for the circulation of cooling air for cooling the compressor and turbine wheel.

In witness whereof, I have hereunto set my hand this 28th day of May, 1919.

SANFORD A. MOSS.